United States Patent

Wichtel

[11] 3,790,076
[45] Feb. 5, 1974

[54] PILOT-OPERATED STEAM TRAPS
[75] Inventor: Alejandro Wichtel, Wyncote, Pa.
[73] Assignee: Yarway Corporation, Blue Bell, Pa.
[22] Filed: Apr. 27, 1973
[21] Appl. No.: 355,274

Related U.S. Application Data
[63] Continuation of Ser. No. 200,810, Nov. 22, 1971, abandoned.

[52] U.S. Cl. .................. 236/54, 236/101, 251/38
[51] Int. Cl. ............................................. F16t 1/08
[58] Field of Search .......... 236/54, 59, 87, 101, 93; 337/370, 371; 251/38, 11

[56] References Cited
UNITED STATES PATENTS

| | | | |
|---|---|---|---|
| 2,271,850 | 2/1942 | Zinkil | 236/93 |
| 2,629,553 | 2/1953 | Velan | 236/59 |
| 2,257,870 | 8/1956 | Velan | 236/93 |
| 3,220,650 | 10/1965 | Deeks | 236/59 |
| 3,175,766 | 3/1965 | Pape et al. | 236/59 |
| 3,169,704 | 2/1965 | Domm et al. | 236/59 |

*Primary Examiner*—William E. Wayner
*Assistant Examiner*—W. E. Tapolcai, Jr.
*Attorney, Agent, or Firm*—John W. Logan, Jr.

[57] ABSTRACT

A pilot-operated steam trap is provided with a series of bimetallic elements which operate sequentially to control the opening and closing of the pilot valve of a pilot-operated steam trap. Each separate series of the bimetallic elements have their outer edges on separate shoulders within the valve member and have central openings through which the stem of the pilot valve passes. Separate shoulders are provided on the stem of the pilot valve, each adapted to be engaged by one of the series of bimetallic elements to prevent transmission of the force of one bimetallic element to the next adjacent bimetallic element.

6 Claims, 4 Drawing Figures

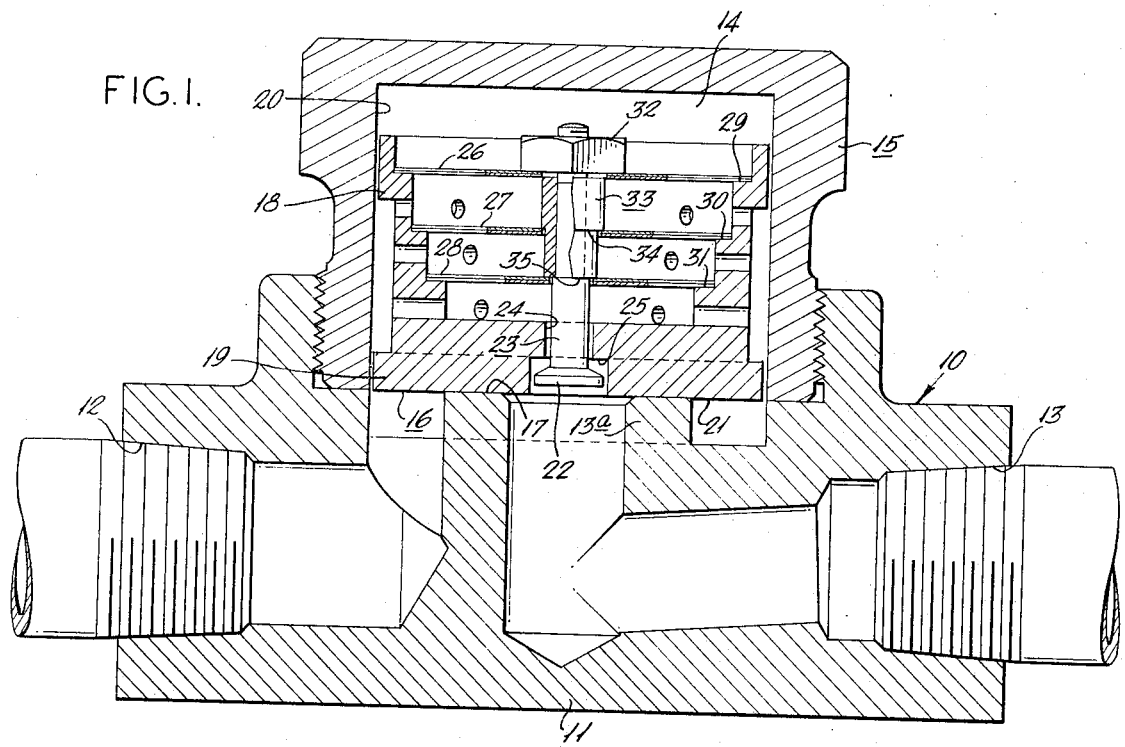

PILOT-OPERATED STEAM TRAPS

This is a continuation of application Ser. No. 200,810, filed Nov. 22, 1971, now abandoned.

The present invention relates to new and useful improvements in pilot-operated steam traps and more particularly to improvements in the means for actuating and controlling the pilot valves of such steam traps.

In application Ser. No. 136,493, filed Apr. 23, 1971, now abandoned, by Warren H. Brand and John Scott, Jr., and assigned to the assignee of the present application, there is disclosed a pilot-operated steam trap in which the pilot valve is controlled by a temperature responsive bellows. The arrangement of bimetallic elements of the present invention provides a different control of the pilot valve over the normal condensate load range from the structure of the above application. Bimetallic elements have previously been used to control operation of a steam trap. An example of this is the Domm et al U.S. Pat. No. 3,169,704. In Domm, however, the elements must be in opposed pairs and work against one another. Also, in the construction of the Domm patent the force to control the valve is transmitted from one set of bimetallic elements to the next set thereby unnecessarily stressing each bimetallic element.

With the foregoing in mind, a primary object of the present invention is to provide a novel pilot-operated steam trap whose operation is closely and accurately controlled in response to changes in conditions within the steam trap control chamber.

Another object of the present invention is to provide a novel pilot-operated steam trap having the ability to handle heavy condensate loads but which will also provide good control with light condensate loads.

A further object of the present invention is to provide novel control means for a pilot-operated steam trap which will closely follow the saturation curve of the fluid in the trap.

When the condensate load on a conventional steam trap is low, up to approximately 10 percent of rated capacity, the steam trap is normally not in good control. It is an object of this invention to provide an improved steam trap which will properly control the flow of condensate within this normally uncontrollable low range of operation.

A still further object of the present invention is to provide a steam trap which will provide modulation of control over the normal condensate load and when the condensate load gets above normal will rapidly discharge the excess condensate.

An additional object of the present invention is to provide novel control means for the pilot valve of a pilot-operated steam trap which will control movement of the pilot valve in such a manner to prevent wire drawing of the pilot valve and valve seat.

Still a further object of the present invention is to provide a novel pilot-operated steam trap which is easy to assemble and in which the control means for the pilot can be easily inserted or replaced and the position of the pilot valve can be easily adjusted.

A further object of the present invention is to provide a novel pilot-operated steam trap which may be manufactured and assembled easily and economically and which is entirely efficient and effective in operation.

These and other objects of the present invention and the various features and details thereof are hereinafter more fully set forth and described with reference to the accompanying drawings, in which:

FIG. 1 is a longitudinal sectional view through a steam trap made in accordance with the present invention;

FIG. 2 is an enlarged fragmentary longitudinal sectional view of the pilot valve with the pilot in a partially open position;

FIG. 3 is an exploded perspective view showing the assembly of the bimetallic elements for controlling the pilot valve of the steam trap; and FIG. 4 is a chart illustrating how the pilot operation closely follows the steam saturation curve.

Referring more specifically to the drawings, there is illustrated in FIG. 1 a steam trap 10 made in accordance with the present invention. The steam trap 10 includes a trap body 11 having an inlet 12 adapted to be connected to a suitable steam line from which condensate is to be drained and an outlet 13 connected to a suitable condensate line. A control chamber 14 is provided within the steam trap intermediate the inlet 12 and outlet 13. This control chamber is formed by a bonnet 15 mounted on the valve body 11.

For the purpose of selectively controlling flow of a main stream of condensate through the steam trap 10 a hollow main valve assembly 16 is provided. This main valve assembly 16 is adapted to seat on a main valve seat 17 surrounding an upturned portion 13a of the outlet 13 to control flow of fluid through the trap. In the illustrated embodiment of the present invention the main valve assembly 16 is in the form of a hollow piston having circumferentially-extending axially-spaced upper and lower ribs 18 and 19 which closely fit within the inner cylindrical surface 20 of the bonnet 15. A surface 21 is provided at the lower end of the main valve assembly to engage the main valve seat 17. It should be understood that the surface 21 and seat 17 may be of any desired configuration to control flow of fluid through the steam trap. The main valve assembly 16 is adapted to slide longitudinally within the bonnet 15 to permit opening and closing of the steam trap.

According to the present invention, a pilot valve 22 carried by a valve stem 23 is provided extending through a central opening 24 in the bottom of the main valve assembly 16. The pilot valve 22 is adapted to engage against a pilot valve seat 25 in the opening 24 to control flow of fluid from the control chamber 14 to the steam trap outlet 13.

In the illustrated embodiment of this invention, the main valve assembly 16 is displaced axially in response to the application of pressure forces on opposite ends of the main valve assembly. To properly control displacement of the main valve assembly, a first control flow passage of fixed resistance to flow is provided by the clearance between the outer periphery of the main valve assembly and the inner surface 20 of the bonnet 15. This first control flow passage permits fluid communication between the inlet 12 and the upper portion of the control chamber 14. A second control flow passage from the control chamber 14 to the outlet 13 is provided through the central opening 24 in the main valve assembly. This second control flow passage provides a variable resistance to flow depending upon the position of the pilot valve 22 relative to the pilot valve seat 25. The fixed resistance to flow of the first control flow passage must necessarily be equal to or greater than the resistance to flow through the second control flow passage when the pilot valve is in its fully open position but substantially less than the resistance to flow through the second flow control passage when the pilot valve is less than fully open to permit operation of the main valve assembly as more fully set forth hereinafter.

When the pilot valve 22 is closed, the fluid pressure within the control chamber 14 will be substantially equal to the fluid pressure at the inlet 12 and the main valve assembly will remain in its closed position. Opening the pilot valve will vent fluid from the control chamber 14 to the outlet 13. Fluid will continue to flow through the first control flow passage into the control chamber and then through the second control flow passage (the opening 24) to the outlet. Continued opening of the pilot valve increases the size of the second control flow passage causing further decrease of pressure within the control chamber. After a predetermined pressure drop which will occur when the resistance to flow of the second control flow passage is substantially equal to the resistance to flow of the first control flow passage, the main valve assembly will be caused to move to its open position permitting flow of fluid directly from the inlet to the outlet across the valve seat 17. Similarly, upon closing the pilot valve 22, resistance to flow through the opening 24 or second control flow passage increases thereby decreasing flow through the opening 24 and permitting pressure in the control chamber to increase. At a predetermined pressure within the control chamber the main valve assembly will move to the closed position stopping flow across the valve seat 17.

It is extremely desirable that the pilot valve and pilot valve seat be of such a size that they will accommodate approximately 10 to 25 percent of the total capacity of the flow of the steam trap. This permits flow of condensate through the pilot valve in the low range of capacity of the steam trap. Thus, there can be good modulation and control of flow of condensate through the steam trap at the normally unstable low range of capacity of the trap. When the requirement for flow of the condensate is greater than the limited capacity of the pilot valve, the pilot valve will be in its fully open position and the main valve assembly will open, thus permitting this greater quantity of condensate to flow directly from the inlet to the outlet across the main valve seat 17. This construction is particularly advantageous for use in situations where there is a greatly varying condensate load required to be handled by the steam trap.

In accordance with the present invention the position of the pilot valve 22 relative to the pilot valve seat 25 is controlled in accordance with the temperature of the fluid within the control chamber 14. When steam is present in the control chamber 14, the pilot valve will close preventing flow of fluid through the trap. As the temperature in the control chamber 14 drops and condensate is present at the steam trap, the pilot valve will open permitting this condensate to be discharged through the trap. Accordingly, a thermal responsive control means is provided to control the position of the pilot valve.

In the present invention, the thermal responsive control means for controlling the position of the pilot valve comprises a series of bimetallic elements in engagement with inner shoulders on the main valve assembly 16 and interconnected independently to the pilot valve stem 23. As illustrated in FIGS. 1, 2 and 3 of the drawings, three separate vertically spaced bimetallic elements are provided designated from the upper to the lower as 26, 27 and 28. The upper, intermediate and lower bimetallic elements 26, 27, 28 are loosely engaged on upwardly facing shoulders 29, 30 and 31, respectively, provided on the inner surface of the main valve assembly 16. Each of the three bimetallic elements 26, 27 and 28 are normally in the substantially flat condition as shown in FIG. 1 at usual room temperatures. These bimetallic elements will deflect upwardly at varying rates as more fully described hereinafter upon an increase in temperature within the control chamber 14. The bimetallic elements 26, 27 and 28 are of different size, shape and thickness so that the magnitude or rate of deflection and force exerted upon deflection of the upper bimetallic element 26 in response to a change in temperature is different than that of the intermediate bimetallic element for a corresponding change in temperature. Similarly, the magnitude or rate of deflection and force exerted upon deflection of the intermediate bimetallic element for this same change in temperature is different from that of the lower bimetallic element 28 for this corresponding change in temperature.

In order to permit control of the position of the pilot valve 22 with respect to the pilot valve seat 25 by the bimetallic elements 26, 27 and 28, an adjustable stop such as the nut 32 is secured onto the upper end of the pilot valve stem 23. This adjustable stop is adapted to have its lower surface engaged by the upper bimetallic element 26 and is so adjusted that when the upper bimetallic element 26 is in its flat or undeflected condition as it would exist at a low temperature, the pilot valve 22 is fully open. A stepped sleeve 33 is loosely received about the pilot valve stem 23. The stepped sleeve 33 passes through central openings in the upper and intermediate bimetallic elements 26 and 27 and has an intermediate downwardly facing shoulder 34 thereon adapted to engage against the upper surface of the intermediate bimetallic element 27. The lower surface 35 of the stepped sleeve 33 is adapted to engage against the upper surface of the lower bimetallic element 28.

During operation of the steam trap of the present invention, when steam or very hot liquid is present in the control chamber, the bimetallic elements are deflected upwardly and the pilot valve is held closed by the force applied to the valve stem by the bimetallic elements. When the temperature in the control chamber is relatively low as it would be when condensate is flowing through the steam trap, the bimetallic elements are in their substantially flat or undeflected condition and the pilot valve is fully open. Assuming that condensate is flowing through the steam trap and the pilot valve is fully open the steam trap operates in the following manner. As the temperature within the control chamber increases, each of the bimetallic elements deflect upwardly at the previously-described varying rates. The upper bimetallic element 26 will initially engage the lower surface of the adjustable stop 32 and force the valve stem upwardly moving the pilot valve toward its closed position. Depending upon the pressure within the system to which the steam trap is connected, the upper bimetallic element will move the pilot valve to its fully closed position at a low system pressure or to partially closed position to the point where the force exerted by deflection of the upper bimetallic element is no longer capable of overcoming the pressure in the system forcing the pilot valve open. Upon continued increase in temperature, the intermediate bimetallic element will engage against the shoulder 34 of the sleeve 33 and force the sleeve 33 upwardly against the adjustable stop 32 and add additional force on the pilot valve to hold the pilot valve closed or to urge the pilot valve toward the closed position, again depending on the pressure within the system. Upon a further increase in temperature the lower bimetallic element 28 will engage against the lower surface 35 of the stepped sleeve 33 thereby exerting further force to close and maintain the pilot valve closed. Thus, when steam or very hot liquid is present in the control chamber, all three of the bimetallic elements are exerting force through the valve stem to maintain the pilot valve closed.

Similarly, after the pilot valve is fully closed and condensate is collected at the trap, as the temperature in the control chamber is decreased the three bimetallic elements 26, 27 and 28 will operate in reverse of the above-described method to permit movement of the pilot valve toward the fully open position. All of the bimetallic elements will move from their fully deflected position toward the substantially flat position at the previously-described varying rates. As the temperature decreases, the lower bimetallic element will become disengaged from the lower surface 35 of the sleeve 33 before the intermediate bimetallic element becomes disengaged from the shoulder 34 of the sleeve 33. Similarly, the intermediate bimetallic element become disengaged from the shoulder 34 of the sleeve 33 before the upper bimetallic element reaches its substantially flat position. Thus, as the temperature in the control chamber decreases, the force applied by the bimetallic elements to hold the pilot valve in any fixed position decreases. The pilot valve will open when the force exerted on the pilot valve by the pressure within the control chamber is sufficient to overcome the force exerted by the bimetallic elements on the stem of the pilot valve. When the pilot valve is closed, the effective force due to pressure within the control chamber tending to move the pilot valve toward its open position is equal to the pressure within the control chamber times an area equal to the area of the opening 24. This force increases slightly after the pilot valve is partially opened because of the configuration of the pilot valve and the restricted area immediately downstream of the valve seat 25. This effectively provides a slightly larger area than the area of the opening 24 on which the pressure within the chamber operates, thereby moving the pilot valve rapidly away from the valve seat 25 and preventing wire drawing of the valve and valve seat. Upon continued decrease in temperature within the control chamber, the force exerted on the pilot valve by the bimetallic elements on the pilot valve decreases thereby permitting further opening of the pilot valve toward its fully open position.

This above-described arrangement of bimetallic elements for controlling movement of the pilot valve is particularly desirable in that because of the different rates of deflection and the different combinations of temperatures and pressures at which the bimetallic elements disengage from the valve stem, movement of the pilot valve may be caused to closely follow the steam saturation curve as shown in FIG. 4. The solid curved line in FIG. 4 is a representation of the steam saturation curve while the dotted line which closely follows along the steam saturation curve from 0 to $a$ to $b$ to $c$ represents force exerted on the pilot valve by the bimetallic elements. From 0 to $a$, the force on the pilot valve is due to the bimetallic element 26. From $a$ to $b$, the force exerted on the pilot valve is by the upper and intermediate bimetallic elements while from $b$ to $c$ the force exerted on the pilot valve is produced by all three bimetallic elements. Thus, the pilot valve is extremely responsive to the temperature within the control chamber and its movement at any position lags only a very short distance behind the saturation temperature of fluid within the control chamber.

While a particular embodiment of the present invention has been illustrated and described herein, it is apparent that various changes and modifications may be made to the described structure. For example, two or four or more bimetallic elements may be utilized, though the three described elements provide a most satisfactory operation of the pilot valve. Also, other thermostatic elements or groups of elements may be substituted for the individual bimetallic elements.

From the foregoing, it can be seen that the present invention provides a novel pilot-operated steam trap of a relatively simple construction which closely controls low rates of condensate flow yet permits a high rate of condensate flow when necessary.

I claim:

1. A pilot operated steam trap having a body with an inlet and an outlet, means providing a control chamber within said body intermediate the inlet and the outlet, a main valve seat between the inlet and outlet, a generally cylindrical main valve member carried within the control chamber for axial movement toward and away from said main valve seat, said main valve member having a valve portion on one end surface thereof to engage said valve seat and having means defining a recess extending into said main valve member from the other end surface thereof, a first flow control passage of substantially fixed restriction to flow providing fluid communication between the inlet and the control chamber, a second flow control passage through said one end surface of said main valve member providing fluid communication between the control chamber and the outlet, a pilot valve controlling said second flow control passage mounted for movement between closed and open positions, said pilot valve in the fully open position providing said second flow control passage with less restriction to flow than said first flow control passage, a plurality of independent spaced apart temperature responsive elements in said control chamber supported by and movable with said main valve member, means defining a plurality of stepped shoulders corresponding in number to said plurality of temperature responsive elements on said main valve member within said recess, each of said temperature responsive elements having outer edge portions loosely engaged on a corresponding shoulder in said main valve member recess, a stem interconnected with said pilot valve and projecting upwardly centrally of said main valve member recess, said elements each having a central opening therein surrounding said pilot valve stem, means defining a plurality of shoulders corresponding in number to said plurality of temperature responsive elements about said pilot valve stem with each of said shoulders facing in a direction opposite the shoulders of said main valve member recess, said temperature responsive elements each having an inner edge surface surrounding its central opening adapted to engage the corresponding shoulder of said stem between said open and closed positions, each of said plurality of temperature responsive elements adapted to aid in control of movement of said pilot valve, one of said temperature responsive elements adapted to aid in control of movement of said pilot valve from its fully open position to its fully closed position, and at least one other said temperature responsive elements adapted to aid in control of movement of said pilot valve from a partially open position to its fully closed position.

2. Apparatus in accordance with claim 1 in which said temperature responsive elements are bimetallic plates.

3. Apparatus in accordance with claim 2 in which an adjustable stop member is provided on said pilot valve stem forming one of said pilot valve stem shoulders and defining the positions of the remaining of said plurality of pilot valve stem shoulders, and one of said bimetallic plates is in engagement with its corresponding shoulder of said pilot valve stem when steam is present in said control chamber to urge said pilot valve toward said closed position when steam is present in said control chamber.

4. Apparatus in accordance with claim 3 in which another of said bimetallic plates is forceably interconnected with its corresponding pilot valve stem shoulder after a predetermined amount of deflection of said one bimetallic plate.

5. Apparatus in accordance with claim 4 in which said bimetallic plates are substantially flat at lower temperatures in the control chamber and deflect from the flat condition in the same direction upon an increase in temperature in the control chamber.

6. Apparatus in accordance with claim 5 in which said one bimetallic plate has a greater rate of deflection and greater amount of deflection than said other bimetallic plate for the same change in temperature in said control chamber.

* * * * *